No. 876,930. PATENTED JAN. 21, 1908.
S. R. BERGMAN.
DYNAMO ELECTRIC MACHINE.
APPLICATION FILED MAY 3, 1907.
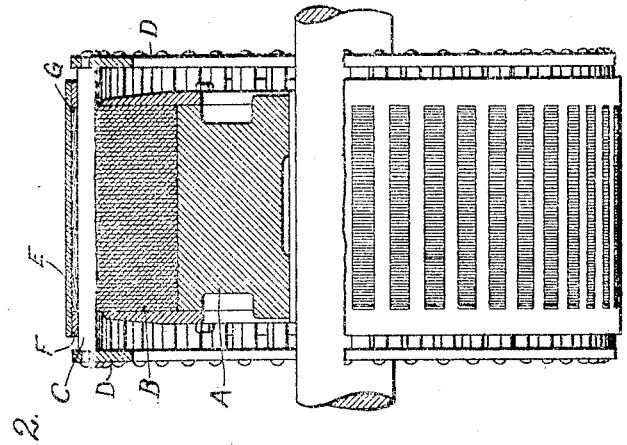
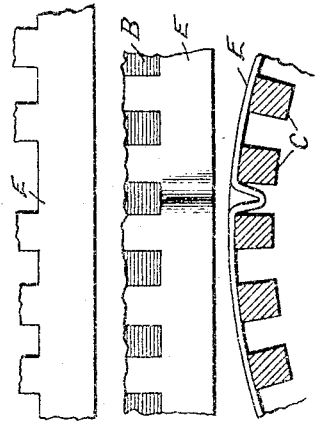
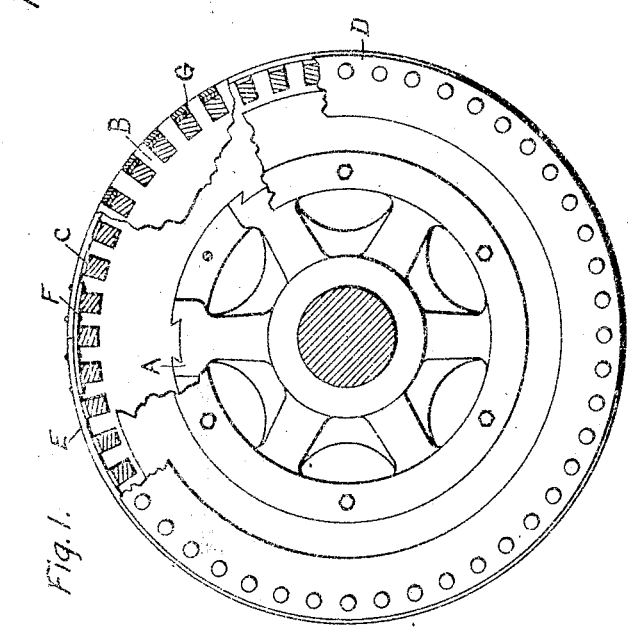
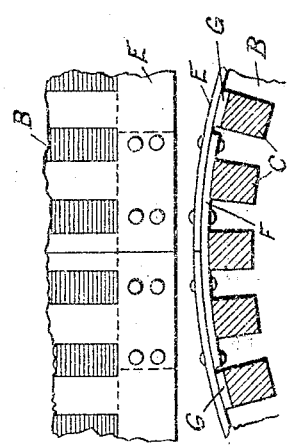
Witnesses
Irving E. Steers.
J. Ellis Glen.
Inventor.
Sven R. Bergman
by Alfred G. Davis
Atty.

UNITED STATES PATENT OFFICE.

SVEN R. BERGMAN, OF LYNN, MASSACHUSETTS, ASSIGNOR TO GENERAL ELECTRIC COMPANY, A CORPORATION OF NEW YORK.

DYNAMO-ELECTRIC MACHINE.

No. 876,930.

Specification of Letters Patent.

Patented Jan. 21, 1908.

Application filed May 8, 1907. Serial No. 372,464.

*To all whom it may concern:*

Be it known that I, SVEN R. BERGMAN, a subject of the King of Sweden, residing at Lynn, county of Essex, State of Massachusetts, have invented certain new and useful Improvements in Dynamo-Electric Machines, of which the following is a specification.

My invention relates to dynamo-electric machines, and particularly to the rotors of induction motors, and its object is to provide a novel construction for obtaining the advantages of both closed and open slots without their attendant disadvantages.

Electrically, closed slots present certain advantages compared to open slots, since, by reducing the reluctance of the air-gap, the magnetizing current is reduced, and, by producing greater uniformity in the air-gap, eddy-current losses in the stator teeth are reduced. Thus, both the power-factor and the efficiency of the motor are improved. Mechanically, however, the closed slot construction possesses disadvantages, first, because the dies required for punching the laminations are more expensive and more easily broken, and second, because, if a coil winding is employed, the cost of the winding is greatly increased, since former-wound coils cannot be used.

My invention consists in arranging the core with open slots and applying to the core a wrapping of magnetic material arranged to enter and magnetically to close the slots. This wrapping may be conveniently formed by a sheet-metal punching preferably of transformer iron provided with slots adapted to pass over the ends of the teeth on the core. The ends of the sheet may be secured together by riveting, after it is applied to the core, or the ends may be welded together, so as to form a continuous cylinder before it is applied to the core. In the latter case the cylinder is made originally with a slightly larger diameter than the core, and, after it is slipped into position, is dented or drawn inward at one or more points, so as to reduce its diameter to that of the core and to pull it into the slots of the core. In order to permit this drawing in of the cylinder, one or more of the slots in the cylinder are made extra wide, as will be hereinafter explained.

My invention will be best understood by reference to the accompanying drawings, in which Figure 1 shows a side elevation, partly broken away, of an induction motor-armature arranged in accordance with my invention; Fig. 2 shows a side elevation of the same, partly in cross-section; Figs. 3 and 4 show a detail of the sheet metal cylinder in plan and in elevation; and Figs. 5 and 6 show detail plan views, and Fig. 7 a detail view in elevation, of a modified construction.

In the drawings, A represents the armature-spider carrying the laminations B, which form the rotor core. These laminations are stamped with open slots, as shown in Fig. 1, in which the conductors C are placed. I have shown these conductors provided with end-rings D forming with the conductors a squirrel-cage winding, but it will be understood that my invention is equally applicable to armatures with coil windings. E represents a cylindrical wrapping which may be stamped out of sheet metal and which forms in effect a second squirrel-cage of magnetic material holding the conductors of the main winding in place. Transformer iron is preferably used for this wrapping on account of its high permeability and high resistance. The ends of the sheet may be riveted together by means of a connecting-plate F, as is clearly shown in Figs. 1 and 4. With this method of joining the ends of the cylinder, the cylinder is raised above the tops of the conductors C, and the spaces between the cylinder and the conductors are filled by strips or wedges G, which may be of any suitable material, such as wood.

A modified method of arranging the sheet-steel wrapping is shown in Figs. 5, 6 and 7. In this modification the original length of the sheet is made slightly greater than the periphery of the rotor core, and the ends are welded together before the cylinder is applied to the core. One or more of the slots in the sheet, which pass over the teeth of the core, are made extra wide, as shown in Fig. 5, so that after the cylinder has been slipped over the core, it may be dented or drawn in at these slots, as shown in Figs. 6 and 7, so as to reduce the diameter of the cylinder to that of the core, and cause the portions of the cylinder between the slots to enter the slots in the core, which operation reduces the effective width of the slots at the points where the cylinder is dented. The dented portions may be secured in position in any suitable manner. This construction has the advantage that each conductor C may fill all of the slot, except that portion occupied by the cylinder E.

It will be seen that the construction described affords the mechanical advantages of the open-slot, and also the electrical advantages of the closed slot.

What I claim as new and desire to secure by Letters Patent of the United States, is,—

1. In a dynamo-electric-machine, a laminated core provided with open slots, a winding carried in said slots, and a continuous wrapping of magnetic material wound around said core and entering and closing said slots.

2. In a dynamo-electric machine, a laminated core provided with open slots, a winding carried in said slots, and a cylindrical sheet of magnetic material surrounding said core and having slots adapted to pass over the ends of the teeth on said core.

3. In a dynamo-electric machine, a laminated core provided with open slots, a winding carried in said slots, a cylinder formed of sheet-metal of high permeability surrounding said core and having slots adapted to pass over the ends of the teeth on said core.

4. A rotor for an induction motor comprising a laminated core provided with open slots, a winding carried in said slots, and a squirrel-cage formed of a slotted cylinder of sheet-metal of high permeability carried in the top of, and closing, said slots.

In witness whereof, I have hereunto set my hand this sixth day of May, 1907.

SVEN R. BERGMAN.

Witnesses:
JOHN A. McMANUS, Jr.,
PHILIP F. HARRINGTON.